United States Patent
de Justo Teixeira et al.

(10) Patent No.: US 8,677,360 B2
(45) Date of Patent: Mar. 18, 2014

(54) THREAD-RELATED ACTIONS BASED ON HISTORICAL THREAD BEHAVIORS

(75) Inventors: Pedro Miguel Sequeira de Justo Teixeira, Redmond, WA (US); Arun U. Kishan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 13/106,627

(22) Filed: May 12, 2011

(65) Prior Publication Data

US 2012/0291033 A1 Nov. 15, 2012

(51) Int. Cl.
*G06F 9/46* (2006.01)

(52) U.S. Cl.
USPC .......................................... 718/100; 718/102

(58) Field of Classification Search
None
See application file for complete search history.

(56) References Cited

U.S. PATENT DOCUMENTS

| | | | |
|---|---|---|---|
| 6,687,904 B1 * | 2/2004 | Gomes et al. | 718/102 |
| 7,681,196 B2 | 3/2010 | Vedula | |
| 7,684,970 B2 * | 3/2010 | Hooper et al. | 703/21 |
| 7,877,587 B2 * | 1/2011 | Vasekin et al. | 712/240 |
| 8,321,874 B2 * | 11/2012 | Jayamohan et al. | 718/108 |
| 8,386,753 B2 * | 2/2013 | Eisen et al. | 712/216 |
| 2005/0183084 A1 | 8/2005 | Cuomo et al. | |
| 2005/0288917 A1 * | 12/2005 | Hooper et al. | 703/21 |
| 2005/0289514 A1 * | 12/2005 | Hooper et al. | 717/124 |
| 2008/0295107 A1 | 11/2008 | Muscarella | |
| 2009/0006520 A1 | 1/2009 | Abib et al. | |
| 2011/0023019 A1 * | 1/2011 | Aniszczyk et al. | 717/128 |
| 2011/0161961 A1 * | 6/2011 | Fu | 718/102 |
| 2012/0255012 A1 * | 10/2012 | Sallam | 726/24 |
| 2012/0255013 A1 * | 10/2012 | Sallam | 726/24 |
| 2012/0255014 A1 * | 10/2012 | Sallam | 726/24 |

OTHER PUBLICATIONS

Meier, et al., "Improving ASP.NET Performance", Retrieved at<<http://msdn.microsoft.com/en-us/library/ff647787.aspx>>, May 2004, pp. 53.
Albahari, Joseph, "Threading in C#", Retrieved at<< http://www.albahari.info/threading/threading.pdf >>, Aug. 13, 2010, pp. 1-125.
"Class ThreadPoolExecutor", Retrieved at<< http://download.oracle.com/javase/1.5.0/docs/api/java/util/concurrent/ThreadPoolExecutor.html>>, Retrieved Date: Jan. 4, 2011, pp. 17.
Schanzer, Emmanuel, "Performance Considerations for Run-Time Technologies in the .NET Framework", Retrieved at<< http://msdn.microsoft.com/en-us/library/ms973838.aspx >>, Aug. 2001, pp. 21.

* cited by examiner

*Primary Examiner* — Van Nguyen
(74) *Attorney, Agent, or Firm* — Tony Azure; Andrew Sanders; Wolfe-SBMC

(57) ABSTRACT

Various embodiments provide techniques for managing threads based on a thread history. In at least some embodiments, a behavior associated with currently existing threads is observed and a thread-related action is performed. A result of the thread-related action with respect to the currently existing threads, resources associated with the currently existing threads (e.g., hardware and/or data resources), and/or other threads, is then observed. A thread history is recorded (e.g., as part of a thread history database) that includes the behavior associated with the currently existing threads, the thread related action that was performed, and the result of the thread-related action. The thread history can include information about multiple different thread behaviors and can be referenced to determine whether to perform thread-related actions in response to other observed thread behaviors.

13 Claims, 6 Drawing Sheets

THREAD-RELATED ACTIONS BASED ON HISTORICAL THREAD BEHAVIORS

BACKGROUND

A process running on a computing device (e.g., as part of an executing application) typically involves the execution of multiple different tasks. A task that is to be executed as part of the process can be assigned a "thread", which is a unit of processing that can be scheduled for a computing device. The thread can then be executed by the computing device to enable the task to be completed.

To take advantage of increases in computer processing capabilities (e.g., multi-core processors and/or computing devices with multiple processors), many computing devices are capable of concurrently running multiple threads. Running multiple threads concurrently can allow processes to be completed quickly and can enable a user to continue interacting with a computing device while the computing device executes additional tasks in the background. Managing concurrently-running threads can present challenges, however. For example, if a processor tries to run too many threads concurrently, the processor can become overloaded and cause a deterioration in computing device performance. If too few threads are created, however, the processing capabilities of a computing device may not be utilized to its potential.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide techniques for managing threads based on a thread history. The thread history can include a history of thread behaviors, thread-related actions, and results of the thread-related actions. In at least some embodiments, a behavior associated with currently existing threads is observed and a thread-related action is performed. A result of the thread-related action with respect to the currently existing threads, resources associated with the currently existing threads (e.g., hardware and/or data resources), and/or other threads, is then observed. For example, the creation of additional threads can result in additional processing tasks being completed (e.g., increased thread throughput) without processor overload or deadlock of an executing process.

A thread history is recorded (e.g., as part of a thread history database) that includes the behavior associated with the currently existing threads, the thread related action that was performed, and the result of the thread-related action. The thread history can include information about multiple different thread behaviors and can be referenced to determine whether to perform thread-related actions in response to other observed thread behaviors.

BRIEF DESCRIPTION OF THE DRAWINGS

The same numbers are used throughout the drawings to reference like features.

DETAILED DESCRIPTION

Overview

Figure 1:
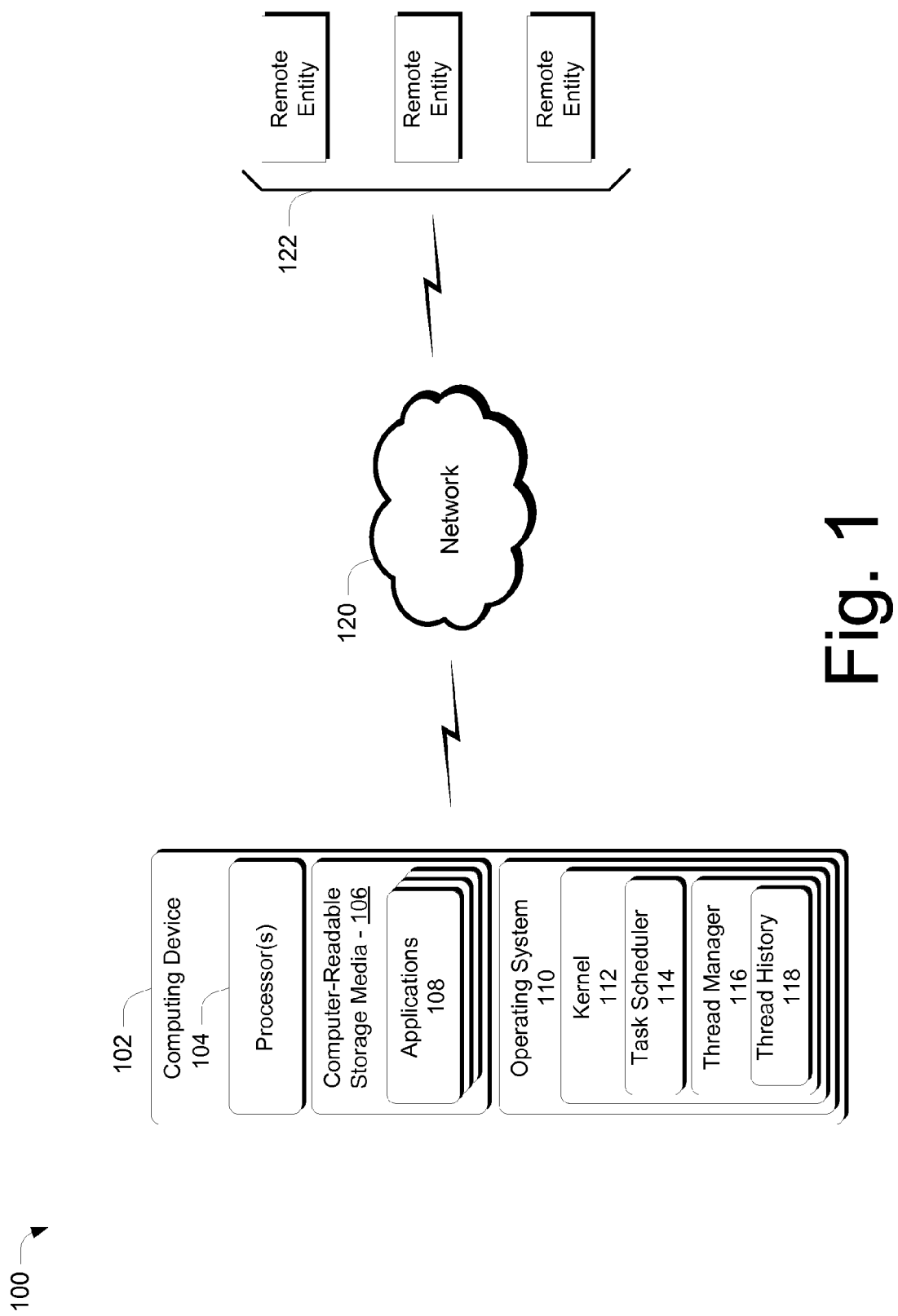
FIG. 1 illustrates an operating environment in which various principles described herein can be employed in accordance with one or more embodiments.

Various embodiments provide techniques for managing threads based on a thread history. The thread history can include a history of thread behaviors, thread-related actions, and results of the thread-related actions. In at least some embodiments, a behavior associated with currently existing threads is observed and a thread-related action is performed in response to the behavior. For example, the behavior can indicate that the currently existing threads are part of a group of inter-dependent threads (e.g., a thread dependency chain) that are blocking on a particular resource and/or task, and the thread-related action can include the creation of additional threads. Additional examples of thread behaviors and thread-related actions are discussed below.

The result of the thread-related action (e.g., the creation of additional threads) with respect to the existing threads and/or other threads is then observed. For example, the creation of additional threads can result in the blocking state being removed and/or additional processing tasks being completed without processor overload or deadlock of an executing process. A thread history is then recorded (e.g., as part of a thread history database) that includes the behavior associated with the currently existing threads, the thread related action that was performed, and the result of the thread-related action. The thread history can include multiple entries, and each entry can indicate a particular thread behavior that was observed (e.g., the blocking state), a thread-related action that was taken in response to the particular thread behavior, and a result of the thread-related action.

Entries in the thread history can also indicate whether a result of the thread-related action was favorable or not. For example, a particular entry can indicate that a particular thread-related action resulted in a process deadlock (e.g., an unfavorable result) or that the action resulted in an increase in thread throughput, e.g., a favorable result. Thus, in managing threads, thread-related actions that resulted in unfavorable results for a particular thread behavior scenario can be avoided and thread-related actions that resulted in favorable results can be repeated in response to future thread scenarios.

In at least some embodiments, the thread history can be referenced to manage threads. For example, an indication of a current thread behavior can be received. The current thread behavior can then be correlated to a historical thread behavior included in the thread history. For example, a historical thread behavior that matches the current thread behavior can be located in the thread history based on matching thread behavior attributes. A thread-related action associated with the historical thread behavior can then be performed. For example, a thread-related action that is indicated as having produced a favorable result with respect to the historical thread behavior can be selected and performed. The result of the thread-related action can again be stored in the thread history, e.g., as a new entry in the thread history and/or as an addition to an existing entry.

Thus, the thread history can evolve as more information about threads and thread-related actions is gathered. This can enable a robust and dynamic set of thread-related scenarios and favorable thread-related actions to be compiled and utilized for managing threads.

In the discussion that follows, a section entitled "Operating Environment" is provided and describes one environment in which one or more embodiments can be employed. Following this, a section entitled "Example Thread Behaviors" describes example thread behaviors in accordance with one or more embodiments. Next, a section entitled "Example Methods" describes example methods in accordance with one or more embodiments. Last, a section entitled "Example System" describes an example system that can be utilized to implement one or more embodiments.

Operating Environment

FIG. 1 illustrates an operating environment in accordance with one or more embodiments, generally at 100. Environment 100 includes a computing device 102 having one or more processors 104 and one or more computer-readable storage media 106. Computing device 102 can be embodied as any suitable computing device such as, by way of example and not limitation, a desktop computer, a portable computer, a handheld computer such as a personal digital assistant (PDA), cell phone, and the like. The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 8.

Stored on the computer-readable storage media 106 are one or more applications 108 that include instructions that function, in concert with the device's hardware, to perform various operations. The instructions may be provided by the computer-readable storage media 106 to the computing device 102 through a variety of different configurations.

Computing device 102 also includes an operating system 110 having a kernel 112. The kernel 112 represents a component of the operating system 110 that is employed to abstract functionality of underlying devices of the computing device 102 (e.g., the processor(s) 104) to the applications 108 and other software that is executed by the computing device 102.

To assist in the implementation of various techniques discussed herein, the kernel 112 includes a task scheduler 114 and a thread manager 116 that maintains and/or makes use of a thread history 118. In at least some embodiments, the task scheduler 114 is configured to assign tasks to threads. For example, one of the applications 108 can submit a task to be completed, and the task scheduler 114 can assign the task to a particular thread to enable the task to be completed, e.g., by the processor(s) 104.

In at least some embodiments, the thread manager 116 is configured to control the number of threads that are available to handle tasks. For example, the thread manager 116 can specify that a certain number of threads are available at a given time for the task scheduler 114 to assign tasks to. Additionally, and as discussed in more detail elsewhere herein, the thread manager 116 is configured to observe thread-related behaviors, perform thread-related actions (e.g., the creation and/or cancellation of threads), and observe results of thread-related actions. The thread manager 116 can also record thread-related information as part of the thread history 118, such as the thread-related behaviors, thread-related actions, and the results of thread-related actions.

In at least some embodiments, the thread history 118 includes multiple thread entries that each includes information about a particular thread behavior scenario. For example, a particular thread entry can indicate a thread-related behavior (e.g., a resource and/or task blocking event), resources associated with the thread-related behavior, an action that was taken in response to the thread-related behavior, and a result of the action. A thread entry can also include a qualitative indicator for a particular result, e.g., whether the result favorable or unfavorable. The thread entries can be catalogued in the thread history 118 and searched to determine actions that can be taken in response to other thread-related scenarios.

In at least some embodiments, the thread manager 116 can use the thread history 118 to control the number of threads that are available at a given time to handle tasks. For example, the thread manager 116 can observe aspects of a current thread-related scenario, such as a blocking event associated with the thread-related scenario, a number of threads associated with the blocking event, a resource associated with the blocking event, and so on. The thread manager 116 can correlate the current thread-related scenario to a thread entry of the thread history 118 based on matching the aspects of the current thread-related scenario to aspects of the thread entry.

Based on the correlated thread entry, the thread manager 116 can determine a thread-related action to take in response to the current thread-related action. For example, the correlated thread entry can include an indication of a thread-related action that produced a favorable result when performed in response to a historical thread-related scenario. The thread manager 116 can cause the thread-related action to be performed in response to the current thread-related scenario, such as allowing additional threads to be created and/or preventing additional threads from being created.

As discussed in more detail below, the thread manager 116 can observe results of performing the thread-related action with respect to the current thread-related scenario, and can record the results as an additional thread entry in the thread history 118. Thus, the thread manager 116 can use the thread history 118 to identify patterns (e.g., blocking patterns) associated with thread-related scenarios and to determine thread-related actions that can be performed to product favorable results with respect to the thread-related scenarios.

While the task scheduler 114, the thread manager 116, and the thread history 118 are discussed as being implemented within the kernel 112, this is not intended to be limiting. For example, in some embodiments the task scheduler, the thread manager, and/or the thread history can be stored and/or implemented externally from the kernel 112, such as via software or firmware that resides externally to the operating system 110 on the computing device 102.

Environment 100 also includes a network 120, such as the Internet, and one or more remote entities 122 with which the computing device 102 can communicate. Examples of the remote entities 122 include a web server, a cloud computing resource, and so on. In some embodiments, a thread executing on the computing device 102 can include a request to access a file or other information from the remote entities 122.

Having described an example operating environment, consider now a discussion of an example thread-related behaviors in accordance with one or more embodiments.

Example Thread Behaviors

This section discusses a number of example thread behaviors that can occur during the execution of tasks by a computing device, such as the computing device 102. According to at least some embodiments, threads included as part of the example thread behaviors can be managed by the thread manager 116 and can be used to submit tasks to be executed to the processor(s) 104. For example, one of the applications 108 executing on the computing device 102 can submit a task to be completed to the operating system 110, e.g., a request for access to a hardware resource and/or a data resource. The thread manager 116 can receive the request for the operating system and can create a thread for the task. The thread can then be submitted to the processor(s) 104 such that the task can be completed.

Figure 2:
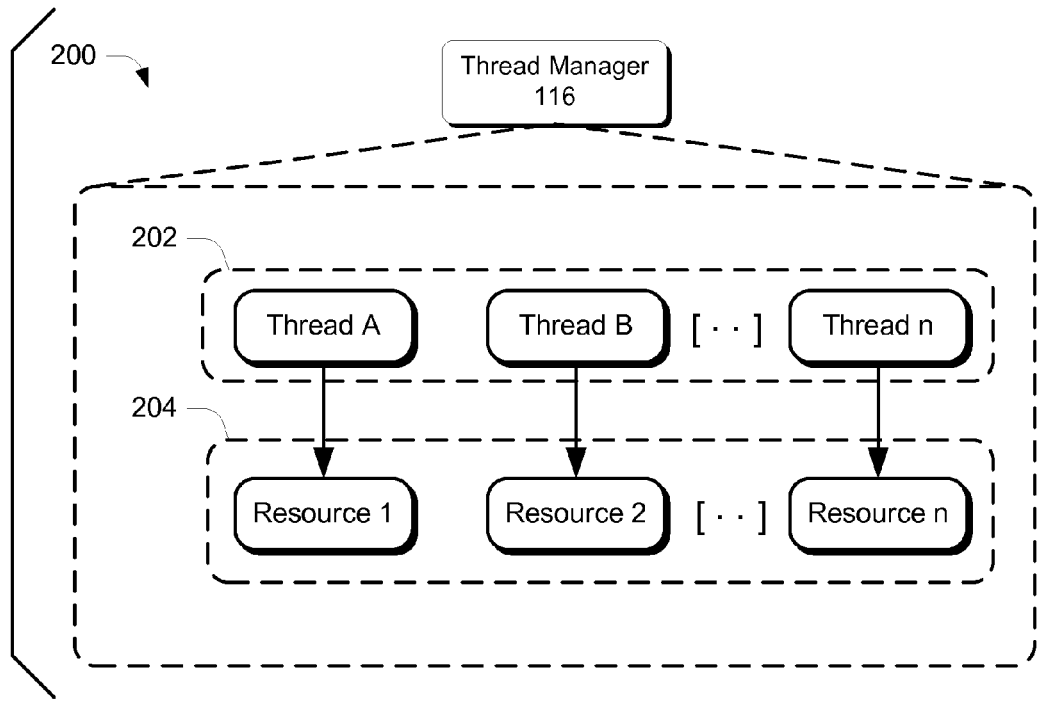
FIG. 2 illustrates an example thread behavior in accordance with one or more embodiments.

FIG. 2 diagrammatically illustrates a thread behavior 200 in accordance with one or more embodiments. Thread behavior 200 includes threads 202. The threads 202 can be associated with a single executing process and/or different executing processes. Also included as part of the thread behavior 200 are resources 204 that can be utilized by the threads 202. Examples of the resources 204 include, by way of example and not limitation, a hardware resource (e.g., a memory address), a data resource (e.g., a file), an input/output resource, and so on. In this particular example, each of the threads 202 is attempting to access a different one of the resources 204.

Further to the thread behavior 200, consider a scenario where each of the resources 204 is not immediately available and forward progress of each of the threads 202 depends on access to a respective one of the resources. While each of the threads is waiting for access to a respective one of the resources, the thread will exist in a blocking state where the thread will not progress in its execution until a respective resource becomes available and the thread accesses the resource. In at least some embodiments, the thread manager 116 can observe attributes of the thread behavior 200, such as the origin of the threads 202 (e.g., the application(s) or process(es) that requested the creation of the threads), the number of threads that are in a blocking state, the identity of each of the resources 204 that a thread is blocking on, and so on.

In at least some embodiments, the thread manager 116 can perform a thread-related action in response to observing the thread behavior 200. For example, the thread manager can determine that additional threads are to be created so that additional tasks can be assigned threads and executed. Alternatively, the thread manager can prevent additional threads from being created, e.g., because the number of threads allotted to a particular application or process has exceeded a threshold number of threads.

Further to this example scenario, the thread manager 116 can observe the result of the thread-related action with respect to a status of the threads 202, statuses of other threads, and/or a status of the resources 204. In at least some embodiments, the thread status can indicate an increase in thread throughput (e.g., the number of threads processed by the processor(s) 104), a decrease in thread throughput, that one or more threads are in a blocking state, and so on. An example of a resource status includes an indication of processor overload, e.g., too many threads were created and task throughput of the processor(s) 104 has slowed or stopped.

According to one or more embodiments, the thread manager 116 can record the attributes of the thread behavior 200 (examples of which are given above), the thread related action, and/or results of the thread-related action, as part of the thread history 118. As discussed above and below, the thread history 118 can be referenced by the thread manager 116 to respond to other observed thread behaviors, e.g., thread behaviors that match or are similar to the thread behavior 200.

Figure 3:
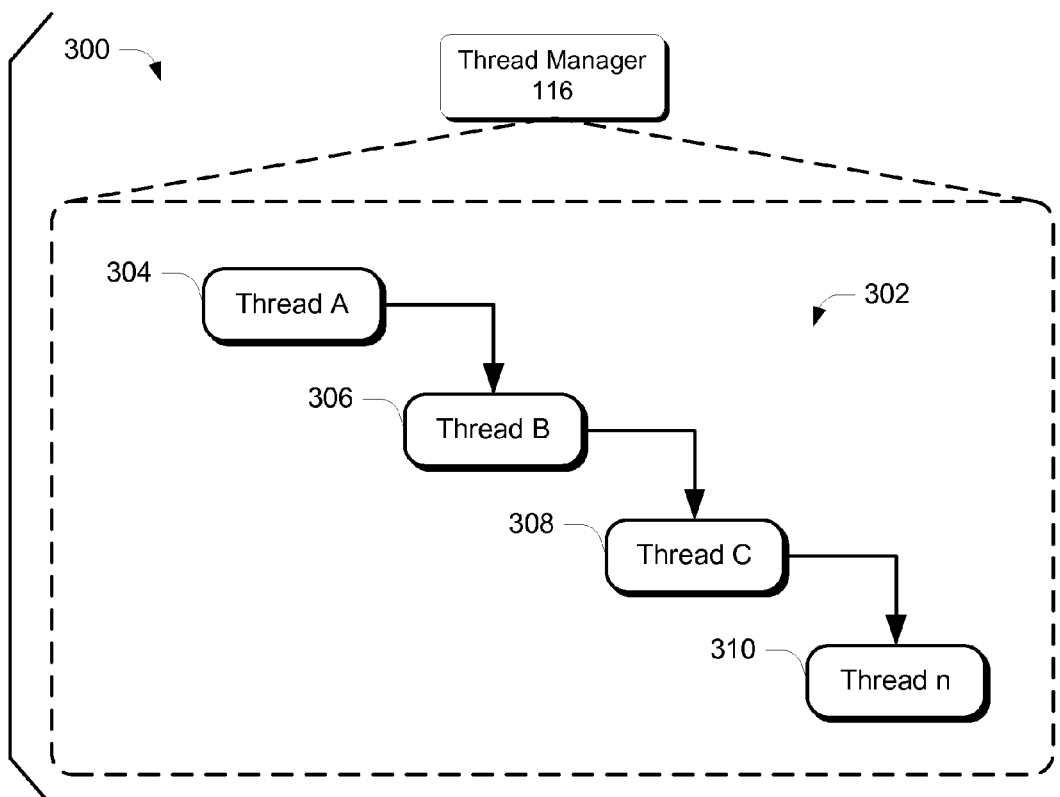
FIG. 3 illustrates an example thread behavior in accordance with one or more embodiments.

FIG. 3 diagrammatically illustrates a thread behavior 300 in accordance with one or more embodiments. Thread behavior 300 includes threads 302 that are each assigned a particular task to execute, e.g., as a part of an application or other process. Forward progress (e.g., execution) of several individual threads of the threads 302 is dependent on the execution of different threads. For example, a thread 304 is dependent on the execution of a thread 306, which is in turn dependent on the execution of a thread 308, which is in turn dependent on the execution of a thread 310. Thus, the threads 302 are part of a chain of inter-dependent threads (a "dependency chain"), the forward progress of which depends on the execution of respective threads of the chain.

Further to the thread behavior 300, consider a scenario where the thread 310 is in a blocking state waiting for access to a particular resource, e.g., a hardware resource, a different thread, and so on. In this particular scenario, forward progress of the preceding threads in the dependency chain will wait until the thread 310 accesses the particular resource and continues and/or finishes its execution.

In at least some embodiments, the thread manager 116 can observe attributes of the thread behavior 300, such as a number of threads associated with the threads 302, origins of the threads 302, an identity of a resource that the thread 310 is blocking on, and so on. The thread manager 116 can then perform a thread-related action (examples of which are given above and below) and observe results of the thread-related action with respect to the threads 302, the attributes of the threads 302, and/or other threads.

According to one example of a thread-related action in this scenario, the thread manager 116 can prevent new threads from being created. One possible result of this action is a thread deadlock situation, however, if no new threads are available to handle new tasks. In another example, the thread manager can enable new threads to be created to handle new tasks. With reference to the thread behavior 300, the creation of new threads can enable other tasks and/or processes to move forward while the threads 302 are waiting for the unblocking of the thread 310.

In at least some embodiments, the thread manager 116 can record the attributes of the thread behavior 300, the thread-related action, and/or the results of the thread-related action as part of the thread history 118, e.g., as an entry in the thread history. The thread history 118 can be referenced (e.g., by the thread manager 116) to determine a thread-related action to be taken in response to a thread behavior that matches or is similar to the thread behavior 300.

Figure 4:
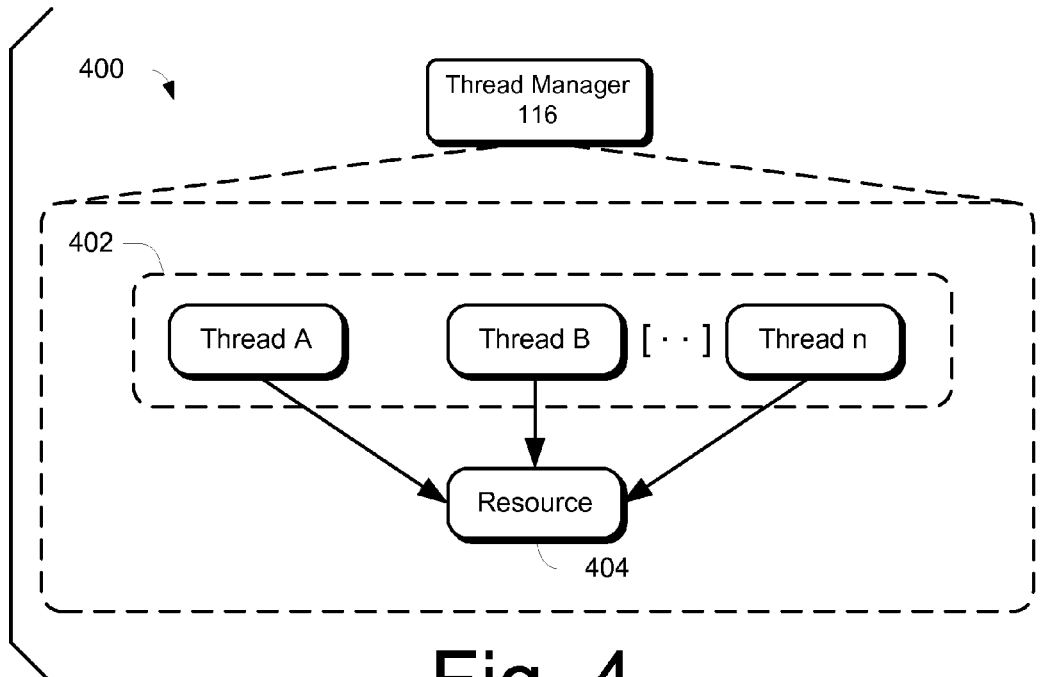
FIG. 4 illustrates an example thread behavior in accordance with one or more embodiments.

FIG. 4 diagrammatically illustrates a thread behavior 400 in accordance with one or more embodiments. The thread behavior 400 includes threads 402 that are each dependent on access to a resource 404 for their forward progress. If the resource 404 is busy (e.g., other threads or processes are accessing the resource), the threads 402 can become blocked waiting for access to the resource.

In at least some embodiments, the threads 402 and the resource 404 are internal to a particular system, e.g., a single computing device. Thus, the threads 402 can be said to be part of an "internal dependency" where the threads depend on access to an internal resource for their forward progress.

Alternatively, the resource 404 can reside externally from the threads 402. For example, the threads 402 can be executing on the computing device 102 and the resource 404 can reside at one of the remote entities 122. In such embodiments, the threads 402 can be said to be part of an "external dependency" where the threads depend on access to an external resource for their forward progress.

In at least some embodiments, the thread manager 116 can observe attributes of the thread behavior 400, such as a number of threads associated with the threads 402, origins of the threads 402, an identity of the resource 404, and so on. The thread manager 116 can then perform a thread-related action and observe the results of the thread-related action with respect to the threads 402, the attributes of the threads, the resource 404, and/or other threads.

Further to the thread behavior 400, consider a scenario where the thread manager 116 observes that the threads 402 are blocking on the resource 404 and causes additional threads to be created to address the blocking. In at least some embodiments, the thread manager 116 can observe that the creation of additional threads does not result in increased thread throughput, e.g., since the threads 402 are waiting on access to the resource 404 and the additional threads will not accelerate the access to the resource. Further, the creation of additional threads to address the blocking state of the threads 402 can cause processing resources to be utilized with little or no return in terms of thread throughput. In this example scenario, the creation of additional threads can be considered to cause an unfavorable result since additional processing resources are utilized with little or no additional thread throughput.

In at least some embodiments, the thread manager 116 can record the attributes of the thread behavior 400, the thread-related action, and/or the results of the thread-related action as part of the thread history 118. For example, the thread manager can indicate in the thread history that the creation of additional threads in response to the thread behavior 400 did not increase thread throughput or accelerate the unblocking of the threads 402. Further, the thread manager 116 can indicate that no additional threads are to be created in response to a thread behavior similar to thread behavior 400, e.g., in response to an internal dependency and/or an external dependency. Thus, if the thread manager subsequently observes a similar thread behavior, the thread manager can reference the thread history 118 and select a different thread-related action or no thread-related action.

Figure 5:
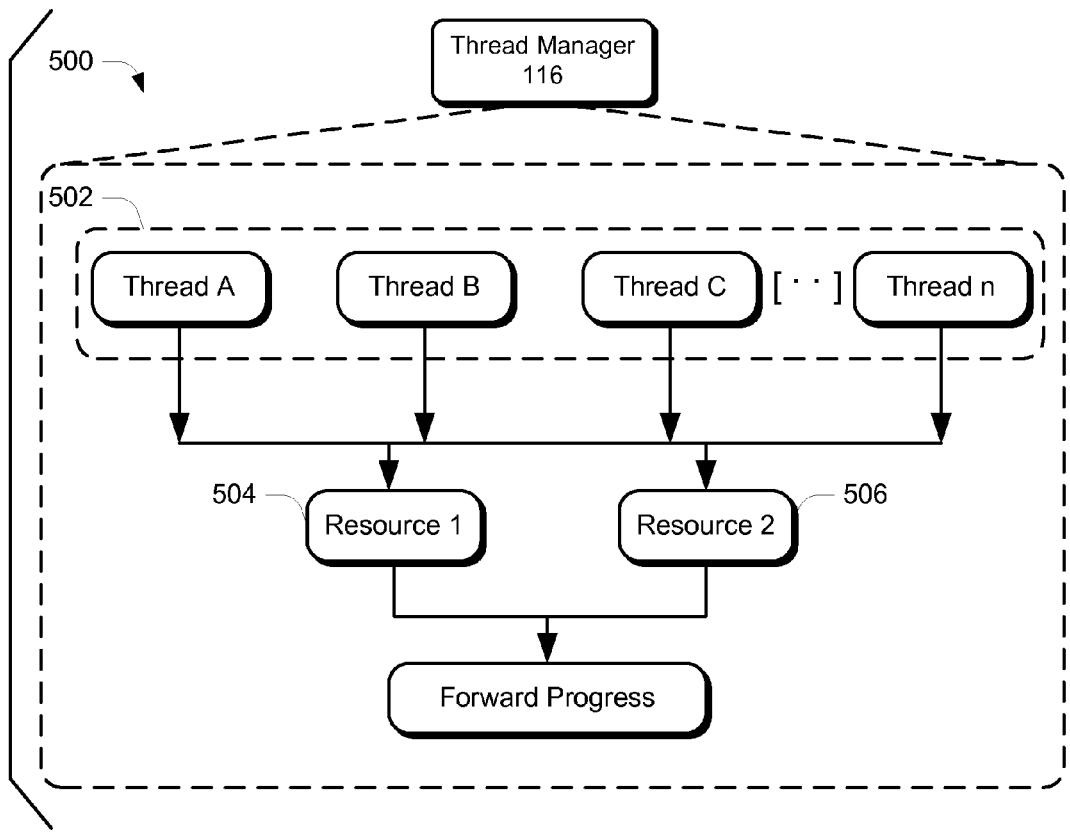
FIG. 5 illustrates an example thread behavior in accordance with one or more embodiments.

FIG. 5 diagrammatically illustrates a thread behavior 500 in accordance with one or more embodiments. The thread behavior 500 includes threads 502 that are alternately dependent on access to a resource 504 or a resource 506 for their forward progress. For example, if the resource 504 and the resource 506 are busy (e.g., other threads or processes are accessing the resources), the threads 502 can become blocked waiting for access to the resources. If either one of the resource 504 or the resource 506 become available, however, one or more of the threads 502 can access the particular resource and progress forward in their execution. Thus, the threads 502 can be said to be part of an "alternate dependency" where the threads are alternately dependent on access to one of multiple different resources but not dependent on access to all of the multiple different resources.

In at least some embodiments, the thread manager 116 can observe attributes of the thread behavior 500, such as a number of threads associated with the threads 502, origins of the threads 502, identities of the resource 504 and/or the resource 506, and so on. The thread manager 116 can then perform a thread-related action (examples of which are given above and below) and observe results of the thread-related action with respect to the threads 502, the resources 504 and 506, other threads, and so on.

For example, consider a scenario where the thread manager 116 causes additional threads to be created and observes the result of the creation of the additional threads. In at least some embodiments, the creation of additional threads can cause an increase in thread throughput (e.g., with respect to the threads 502 and/or other threads) and thus can be considered a favorable result of the thread-related action.

Alternatively, the thread manager 116 can prevent additional threads from being created. In at least some embodiments, preventing additional threads from being created can lead to a computer and/or process deadlock situation if the threads 502 are in a blocking state waiting for access to one of the resources 504 and 506 and additional threads are not available for performing additional processing tasks. Thus, preventing additional threads from being created in such a scenario can be considered to have caused an unfavorable result.

In at least some embodiments, the thread manager 116 can record the attributes of the thread behavior 500, the thread-related action, and/or the results of the thread-related action as part of (e.g., an entry in) the thread history 118. For example, the thread manager can indicate in the thread history that the creation of additional threads in response to the thread behavior 500 caused an increase in thread throughput and thus produced a favorable result. Additionally, the thread manager can indicate in the thread history that preventing the creation of additional threads in response to the thread behavior 500 resulted in a deadlock situation and thus produced an unfavorable result. Thus, if the thread manager subsequently observes a similar thread behavior, the thread manager can reference the thread history 118 and determine that additional threads are to be created in response to the thread behavior.

Having discussed example thread behaviors, consider now a discussion of example methods in accordance with one or more embodiments.

Example Methods

Figure 6:
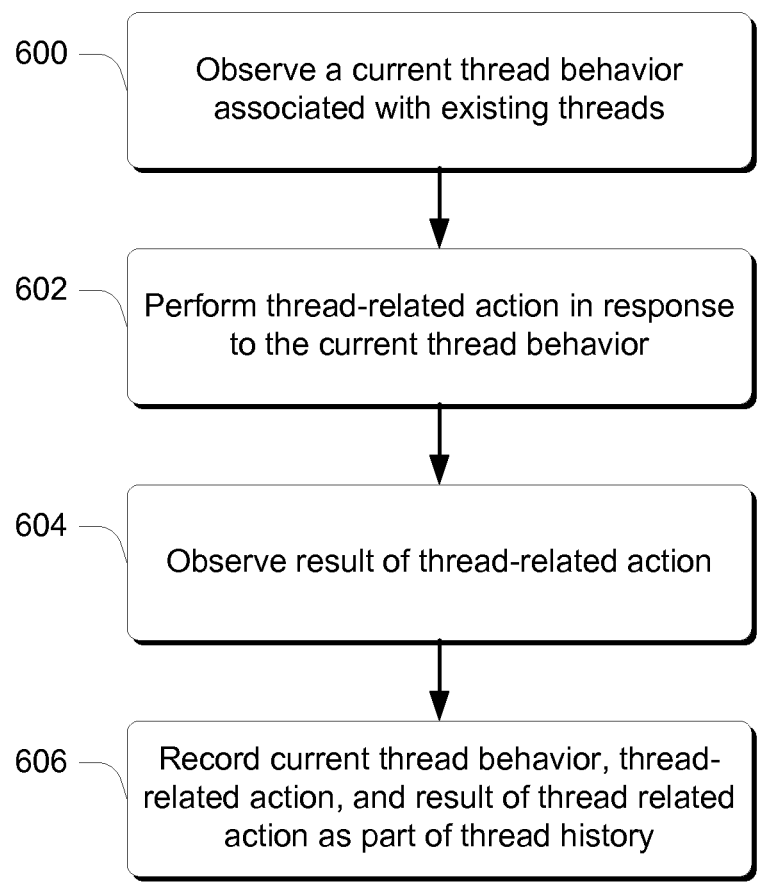
FIG. 6 illustrates an example method in accordance with one or more embodiments.

FIG. 6 is a flow diagram that describes steps a method in accordance with one or more embodiments. The method can be implemented in connection with any suitable hardware, software, firmware, or combination thereof. In at least some embodiments, the method can be implemented via the thread manager 116, discussed above with reference to environment 100.

Step 600 observes a current thread behavior associated with existing threads. Examples of thread behaviors are discussed above and can include attributes of thread behaviors, such as an application or other process that spawned a thread, a resource associated with a thread, and so on. Step 602 performs a thread-related action in response to the current thread behavior. Examples of thread-related actions include causing additional threads to be created, preventing additional threads from being created, splitting individual threads into multiple threads, and so on.

Step 604 observes results of the thread-related action. For example, the results can be in relation to existing threads, such as an increase in thread throughput, a decrease in thread throughput, or no change in thread throughput. Additionally or alternatively, the result can be in relation to various resources, such as data resources (e.g., a file) and/or hardware resources. For example, the thread-related action can affect the processor(s) 104, such as by causing an over-utilization of processing resources of the processors that results in slower data processing and/or no processor throughput. The thread-related action can also affect data resources, such as the ability of a thread or other process to access a local and/or a remote file. In at least some embodiments, the results can indicate that preventing additional threads from being created resulted in a decrease in task throughput and/or an under-utilization of processing resources.

An additional example of a result of the thread-related action pertains to the functioning of an application or other process, such as the applications 108. For example, the thread-related action can cause a particular application to execute more quickly, to execute more slowly, or to stop executing, e.g., to freeze. Thus, in at least some embodiments the thread manager 116 can observe the effect of a thread-related action on an application or other process that is executing on a computing device.

Step 606 records the current thread behavior, the thread-related action, and the result of the thread-related action as part of a thread history. For example, the thread manager 116 can record these features as a new entry and/or an addition to an existing entry in the thread history 118.

Figure 7:
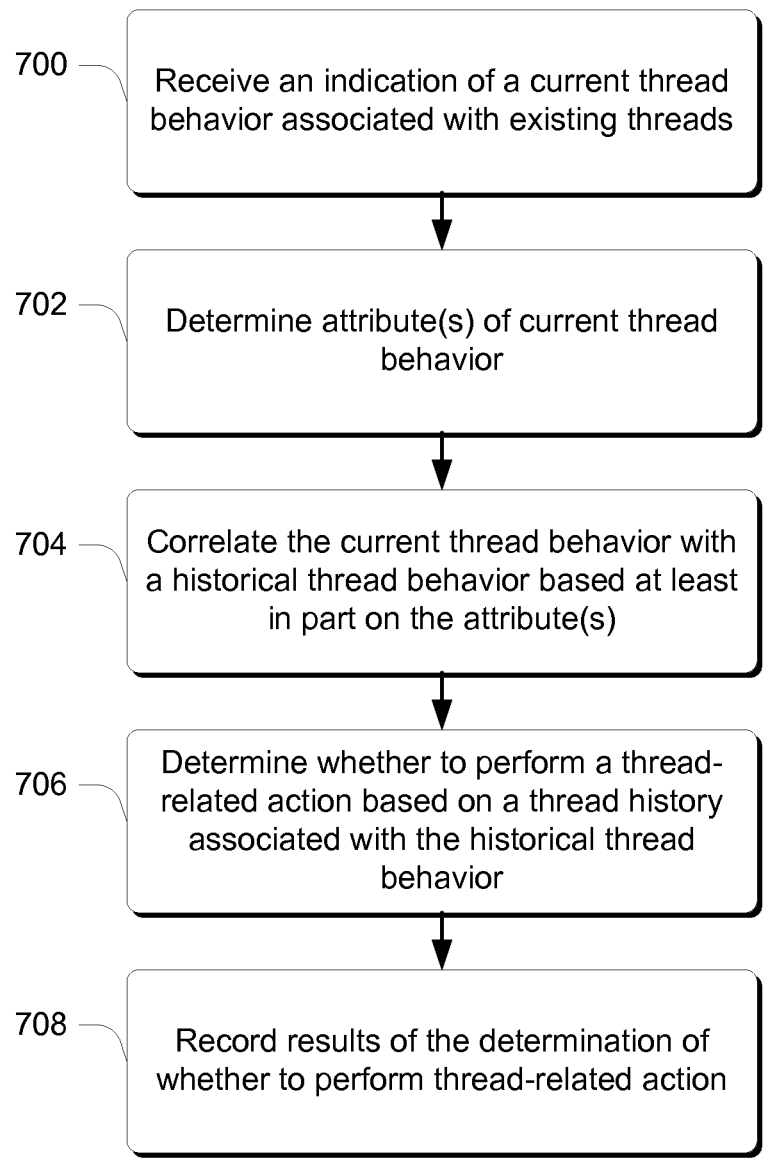
FIG. 7 illustrates an example method in accordance with one or more embodiments.

FIG. 7 is a flow diagram that describes steps a method in accordance with one or more embodiments. The method can be implemented in connection with any suitable hardware, software, firmware, or combination thereof. In at least some embodiments, the method can be implemented via the thread manager 116, discussed above with reference to environment 100.

Step 700 receives an indication of a current thread behavior associated with existing threads. Examples of thread behaviors are discussed above. Step 702 determines attributes of the current thread behavior. Example attributes are discussed above, and can include an application or other process that spawned a thread, a hardware and/or data resource associated with a thread, a number of threads associated with a particular resource, a dependency pattern associated with the current thread behavior, and so on.

Step 704 correlates the current thread behavior with a historical thread behavior based at least in part on the attributes. For example, the thread manager 116 can search the thread history 118 using one or more of the attributes of the current thread behavior to locate a historical thread behavior in the thread history with matching or near matching attributes. In at least some embodiments, multiple historical thread behaviors may include matching or near-matching attributes, and thus the thread manager can select an entry with the most or nearest matching attributes.

Additionally or alternatively, particular thread behavior attributes can be weighted more heavily than others. Thus, when the thread history 118 is searched using current thread behavior attributes, historical thread behaviors with matching attributes that are more heavily weighted can be selected.

Step 706 determines whether to perform a thread-related action based on a thread history associated with the historical thread behavior. For example, the thread history can indicate a thread-related action that produced a favorable result (e.g., an increase in thread throughput, an increase in processor throughput, and so on) when performed in response to the historical thread behavior. The thread history can also indicate a thread-related action that produced an unfavorable result (e.g., a decrease in thread throughput and/or processor performance, a frozen and/or deadlocked application or process, a hardware failure, and so on) when performed in response to the historical thread behavior. Thus, in at least some embodiments the thread manager 116 can select a thread-related action that produced a favorable result and cause the thread-related action to be performed. Additionally, the thread manager can avoid thread-related actions that produced unfavorable results.

Step 708 records the results of the determination of whether to perform the thread-related action. For example, if a particular thread-related action was performed, the thread manager 116 can record the results of the thread-related action as part of the thread history 118. Alternatively, if it was determined that no thread-related action was to be performed, a status of a system (e.g., the computing device 102) associated with the existing threads can be recorded and associated with the determination to perform no thread-related action. The status of the system can include multiple different aspects, such as an amount of thread throughput, a percentage of processor utilization, the performance of applications or other processes executing on the system, and so on.

In at least some embodiments, the results of the determination of whether to perform the thread-related action can be recorded as a new entry in the thread history 118 and/or as an addition to an existing entry. Thus, the thread history 118 can provide a collection of thread-related information that can be referenced in responding to particular thread-related behaviors. Additionally, the thread history 118 can be dynamic in that it can be updated based on new information that is received, such as new thread behaviors and new results of thread-related actions.

Having described methods in accordance with one more embodiments, consider now an example system that can be utilized to implement one or more embodiments.

Example System

Figure 8:
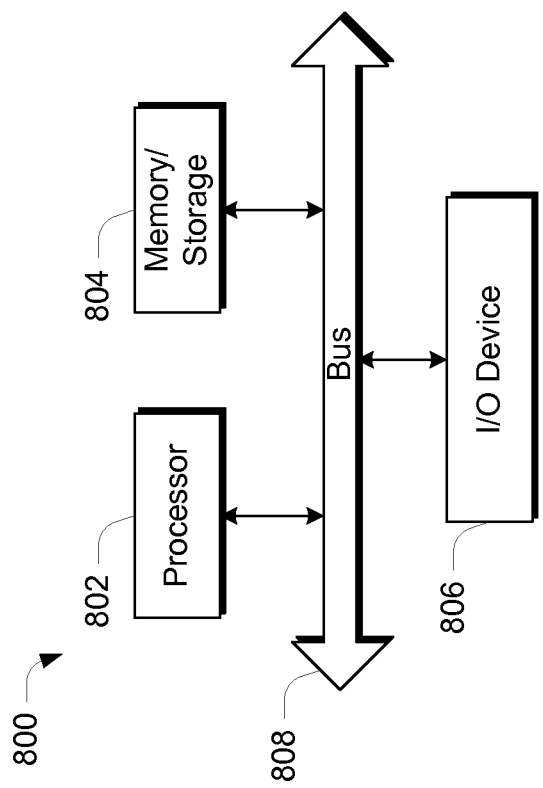
FIG. 8 illustrates an example system that can be used to implement one or more embodiments.

FIG. 8 illustrates an example computing device 800 that can be used to implement the various embodiments described above. Computing device 800 can be, for example, computing device 102 and/or one or more of remote entities 122 of FIG. 1.

Computing device 800 includes one or more processors or processing units 802, one or more memory and/or storage components 804, one or more input/output (I/O) devices 806, and a bus 808 that allows the various components and devices to communicate with one another. Bus 808 represents one or more of any of several types of bus structures, including a memory bus or memory controller, a peripheral bus, an accelerated graphics port, and a processor or local bus using any of a variety of bus architectures. Bus 808 can include wired and/or wireless buses.

Memory/storage component 804 represents one or more computer storage media. Component 804 can include volatile media (such as random access memory (RAM)) and/or non-volatile media (such as read only memory (ROM), Flash memory, optical disks, magnetic disks, and so forth). Component 804 can include fixed media (e.g., RAM, ROM, a fixed hard drive, etc.) as well as removable media (e.g., a Flash memory drive, a removable hard drive, an optical disk, and so forth).

One or more input/output devices 806 allow a user to enter commands and information to computing device 800, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. While the computing device 800 is configured to receive and/or transmit instructions via a signal bearing medium (e.g., as a carrier wave) to implement techniques discussed herein, computer-readable storage media of the computing device are configured to store information and thus do not include a signal bearing medium.

Conclusion

Various embodiments provide techniques for managing threads based on a thread history. In at least some embodiments, a behavior associated with currently existing threads is observed and a thread-related action is performed. A result of the thread-related action with respect to the currently existing threads, resources associated with the currently existing threads (e.g., hardware and/or data resources), and/or other threads, is then observed. A thread history is recorded (e.g., as part of a thread history database) that includes the behavior associated with the currently existing threads, the thread related action that was performed, and the result of the thread-related action. The thread history can include information about multiple different thread behaviors and can be referenced to determine whether to perform thread-related actions in response to other observed thread behaviors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    receiving, by a computer, an indication of a current thread behavior associated with an existing thread;
    determining, by the computer, one or more attributes of the current thread behavior;
    correlating, by the computer, the current thread behavior with one or more historical thread behaviors based at least in part on the one or more attributes; and
    determining, by the computer, whether to perform a thread-related action based on a thread history associated with the one or more historical thread behaviors,
    wherein the attributes of the current thread behavior comprise at least one or more of a blocking event associated with the current thread behavior, an application or process that requested the existing thread, or an identity of a resource that the existing thread is attempting to access,
    wherein the correlating comprises matching the one or more attributes of the current thread behavior to one or more historical attributes of the one or more historical thread behaviors, and
    wherein the thread-related action comprises one of causing one or more new threads to be created or preventing a new thread from being created.

2. The computer-implemented method of claim 1, wherein the current thread behavior comprises one or more of a thread dependency chain, an internal thread dependency, an external thread dependency, or an alternate thread dependency.

3. The computer-implemented method of claim 1, wherein the existing thread is part of a group of concurrently-executing threads and the current thread behavior is associated with the group of concurrently-executing threads.

4. The computer-implemented method of claim 1, wherein the thread history includes an indication of a historical thread-related action associated with the one or more historical thread behaviors and a result of the historical thread-related action being performed.

5. The computer-implemented method of claim 1, wherein determining, by the computer, whether to perform the thread-related action comprises determining, based on the thread history, whether the thread-related action produced a favorable result or an unfavorable result when performed in response to the one or more historical thread behaviors.

6. The computer-implemented method of claim 1, further comprising:
    causing, by the computer, the thread-related action to be performed; and
    recording, by the computer, a result of the thread-related action being performed as part of one or more of the thread history associated with the one or more historical thread behaviors or a thread history associated with the current thread behavior.

7. A computer-implemented method comprising:
    observing, by a computer, a current thread behavior associated with one or more existing threads;
    performing, by the computer, a thread-related action associated with the current thread behavior;
    observing, by the computer, a result of the thread-related action;
    recording, by the computer, the current thread behavior, the thread-related action, and the result of the thread-related action as a thread history,
    receiving, by the computer, an indication of an additional thread behavior associated with one or more different threads;
    determining one or more attributes of the additional thread behavior;
    correlating, by the computer, the additional thread behavior to the current thread behavior based on matching one or more of the attributes of the additional thread behavior to attributes of the current thread behavior; and
    determining, by the computer, whether to perform the thread-related action in response to the additional thread behavior based on an indication in the thread history of whether the thread-related action produced a favorable result or an unfavorable result when performed in response to the current thread behavior,
    wherein the thread-related action comprises causing one or more new threads to be created or preventing a new thread from being created.

8. The computer-implemented method of claim 7, wherein observing, by the computer, the current thread behavior includes observing that the one or more existing threads are attempting to access one or more of a hardware resource or a data resource.

9. The computer-implemented method of claim 7, wherein observing, by the computer, the current thread behavior includes observing an application or other process associated with the one or more existing threads, the method further comprising recording an indication of the application or other process as part of the thread history.

10. The computer-implemented method of claim 7, wherein the result of the thread-related action comprises one of an increase in thread throughput of a computing device or a decrease in thread throughput of the computing device.

11. One or more computer readable storage memories embodying computer readable instructions, the instructions executed by a processor to implement:

a thread manager configured to observe thread behaviors and determine whether to perform thread-related actions; and a thread history configured to store attributes of the thread behaviors as observed by the thread manager, associate the thread behaviors with the thread-related actions, and enable the attributes of the thread behaviors to be searched to determine which of the thread-related actions are associated with particular instances of the thread behaviors, wherein the thread history includes an indication of whether the thread-related actions produced favorable results or unfavorable results when performed, wherein the thread history is searched to correlate a new thread behavior with one or more of the thread behaviors and the thread manager determines whether to perform one or more of the thread-related actions in response to the new thread behavior, and wherein the thread-related actions comprise causing one or more new threads to be created or preventing a new thread from being created.

12. The one or more computer readable storage media of claim 11, wherein one or more of the thread manager or the thread history are implemented within a kernel of an operating system of a computing device.

13. The one or more computer readable storage media of claim 11, wherein the attributes of the thread behaviors include one or more of a number of threads associated with a particular one of the thread behaviors, a hardware resource associated with the particular one of the thread behaviors, or an application associated with the particular one of the thread behaviors.

* * * * *